(12) United States Patent
Hasegawa

(10) Patent No.: US 11,245,177 B1
(45) Date of Patent: Feb. 8, 2022

(54) WIRELESS COMMUNICATION MODULE

(71) Applicant: Fujikura Ltd., Tokyo (JP)

(72) Inventor: Yuta Hasegawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/263,623

(22) PCT Filed: Dec. 14, 2020

(86) PCT No.: PCT/JP2020/046499
§ 371 (c)(1),
(2) Date: Jan. 27, 2021

(30) Foreign Application Priority Data

Jul. 16, 2020 (JP) .............................. JP2020-122027

(51) Int. Cl.
*H01Q 1/22* (2006.01)
*H04B 1/04* (2006.01)
*H01Q 1/02* (2006.01)
*H04B 1/036* (2006.01)

(52) U.S. Cl.
CPC ............. *H01Q 1/2283* (2013.01); *H01Q 1/02* (2013.01); *H04B 1/036* (2013.01); *H04B 1/0475* (2013.01); *H04B 2001/0408* (2013.01)

(58) Field of Classification Search
CPC ........ H01Q 1/2283; H01Q 1/02; H04B 1/036; H04B 1/0475; H04B 2001/0408
See application file for complete search history.

(56) References Cited

U.S. PATENT DOCUMENTS

| 7,830,331 | B2 * | 11/2010 | Yamazaki | ................ | H01Q 1/38 |
| | | | | | 343/906 |
| 2004/0027288 | A1 * | 2/2004 | Okubora | .................. | H01Q 9/14 |
| | | | | | 343/700 MS |
| 2019/0035749 | A1 * | 1/2019 | Dalmia | ................. | H01L 23/552 |

FOREIGN PATENT DOCUMENTS

| JP | 2005-026368 A | 1/2005 |
| JP | 2013-229861 A | 11/2013 |
| WO | 2020/022180 A1 | 1/2020 |

OTHER PUBLICATIONS

Chee, Albert et al., "Integrated Antenna Module for Broadband Wireless Applications", Electronics Packaging Technology Conference, 2004; Cited in the Specification. (4 pages).
International Search Report dated Mar. 9, 2021, issued in counterpart Application No. PCT/JP2020/046499. (2 pages).

* cited by examiner

*Primary Examiner* — Nguyen T Vo
(74) *Attorney, Agent, or Firm* — Westerman, Hattori, Daniels & Adrian, LLP

(57) ABSTRACT

A wireless communication module includes a wireless module board, a frequency converter, an amplifier phase shifter, a band-pass filter, and a communication board, and a through-hole, which penetrates in a direction in which the wireless module board and the communication board are aligned, is formed at a portion of the communication board to which at least one of IC chips of the frequency converter and the amplifier phase shifter faces, and the band-pass filter is covered by the communication board.

6 Claims, 2 Drawing Sheets

WIRELESS COMMUNICATION MODULE

CROSS REFERENCE TO RELATED APPLICATION

The present application is a national phase of international application PCT/JP2020/046499, filed on Dec. 14, 2020, and claims priority under 35 U.S.C. § 119 to Japanese patent application 2020-122027, filed on Jul. 16, 2020, and the contents of which are incorporated herein by reference.

The present invention relates to a wireless communication module.

TECHNICAL FIELD

The present invention relates to a wireless communication module.

The present application claims priority based on Japanese Patent Application No. 2020-122027 filed in Japan on Jul. 16, 2020, the contents of which are incorporated herein by reference.

BACKGROUND ART

In Non-Patent Document 1, the wireless communication module is disclosed on which a wireless module board having an antenna formed on one surface and an IC chip mounted on the other surface is stacked and mounted on a mounting surface of another board (communication board) by a connecting member (bump). In such a wireless communication module, the other surface of the wireless module board on which the IC chip is mounted faces a mounting surface of another board. In this type of wireless communication module, a filter (for example, a band-pass filter) for removing unnecessary radiation may be provided.

PRIOR ART

Non-Patent Document

[Non-Patent Document 1] Albert Chee, et al, "Integrated Antenna Module for Broadband Wireless Applications," Electronics Packaging Technology Conference, 2004

DISCLOSURE OF INVENTION

Problems to be Solved by the Invention

In such a type of wireless communication module, an IC chip (particularly a frequency converter that changes the frequency of a wireless signal, an amplifier phase shifter that changes a phase and intensity of the wireless signal, and the like) is covered with another board; thereby, heat generated in the IC chip tends to be trapped between the wireless module board and another board. However, when a large number of through-holes are formed in another board in order to dissipate the heat of the IC chip without consideration, a wiring layout of another board that constitutes a circuit of the wireless communication module becomes complex. As a result, a wiring for a circuit on another board becomes long.

The present invention has been made in view of the above circumstances, and provides a wireless communication module capable of simplifying a wiring layout on another board while improving heat dissipation of an IC chip.

Means for Solving the Problems

A first aspect of the present invention is a wireless communication module including a wireless module board in which an antenna is formed on a first surface or an inner layer, a frequency converter mounted on a second surface of the wireless module board and changing a frequency of a wireless signal, an amplifier phase shifter mounted on the second surface of the wireless module board and changing a phase and an intensity of the wireless signal, a band-pass filter connected to the frequency convener and the amplifier phase shifter, and mounted on the second surface of the wireless module board so as to be provided between the frequency convener and the amplifier phase shifter, and a communication board provided at intervals on the second surface via a connecting member and electrically connected to the wireless module board by the connecting member, where a through-hole, which penetrates in a direction in which the wireless module board and the communication board am aligned, is formed at a portion of the communication board to which at least one of IC chips of the frequency converter and the amplifier phase shifter faces, and the band-pass filter is covered by the communication board.

In the above-described wireless communication module, the heat generated in the frequency converter and the amplifier phase shifter (IC chip) can be released to the outside of the wireless communication module through the through-hole of the communication board through the gap between the wireless module board and the communication board.

In addition, since the formation of the through-hole for heat dissipation is limited to the portion of the communication board facing the frequency converter and the amplifier phase shifter (IC chip), the number and size of the through-holes in the communication board can be reduced. This makes it possible to simplify the wiring layout on the communication board and reduces the lengthening of the wiring for the circuit on the communication board.

According to the wireless communication module according to a second aspect of the present invention, in the first aspect, a thickness of the band-pass filter may be smaller than a distance between the wireless module board and the communication board.

According to the wireless communication module according to a third aspect of the present invention, in the first or second aspect, a heat dissipation sheet having a higher thermal conductivity than a dielectric material of the communication board may be placed on an upper surface of the IC chip facing the through-hole.

According to the wireless communication module according to a fourth aspect of the present invention, in the third aspect, a dielectric loss tangent of the heat dissipation sheet at a wireless frequency may be greater than that of the communication board.

Effects of the Invention

According to the above aspect of the present invention, it is possible to simplify the wiring layout on the communication board while improving the heat dissipation of the IC chip (frequency converter and amplifier phase shifter).

BEST MODE FOR CARRYING OUT THE INVENTION

Figure 1:
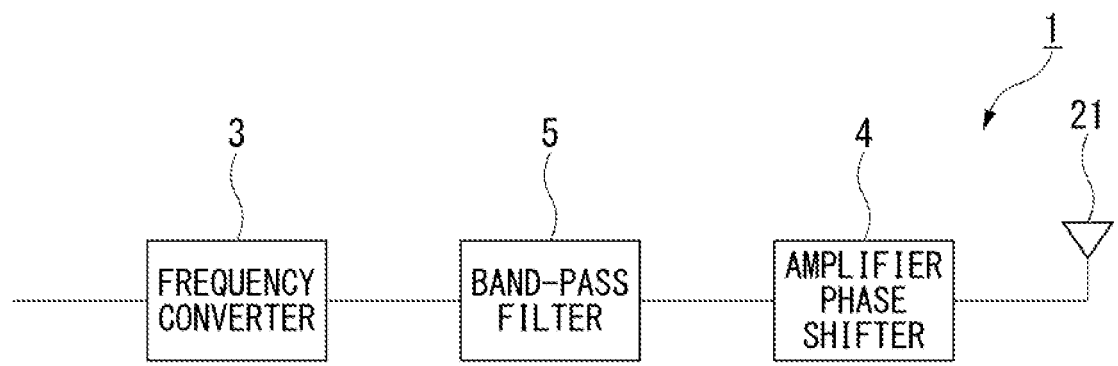
FIG. 1 is a block diagram of a wireless communication module according to an embodiment of the present invention.

Hereinafter, an embodiment of the present invention will be described with reference to FIGS. 1 to 4.

As shown in FIGS. 1 to 4, the wireless communication module 1 according to the present embodiment includes a wireless module board 2, a frequency convener 3, an amplifier phase shifter 4, a band-pass filter 5, and a communication board 6.

A wiring pattern (not shown) is formed on the wireless module board 2. The wiring pattern is made of a conductor such as copper (Cu), and the frequency convener 3, the amplifier phase shifter 4, and the band-pass filter 5, which will be described later, are electrically connected to each other. The wiring pattern is formed on both surfaces 2a and 2b, inside, and the like of the wireless module board 2 (in FIGS. 3 and 4, lower and upper surfaces). An antenna 21 is formed on the wireless module board 2. The antenna 21 is connected to the wiring pattern of the wireless module board 2.

The antenna 21 is formed so as to radiate a wireless signal from one surface (first surface) 2a (lower surface in FIGS. 3 and 4) of the wireless module board 2. The antenna 21 may not be formed at least on the other surface (second surface) 2b (upper surface in FIGS. 3 and 4) of the wireless module board 2. Although not shown in FIGS. 3 and 4, the antenna 21 may be formed on one surface 2a of the wireless module board 2 or may be formed on an inner layer of the wireless module board 2. Furthermore, the antenna 21 may be formed on one surface 2a of the wireless module board 2 and then covered with a dielectric layer.

The frequency converter 3 is an IC chip that changes the frequency of a wireless signal, and is mounted on the other surface 2b of the wireless module board 2. As a result, the frequency converter 3 is connected to the wiring pattern of the wireless module board 2. In the present embodiment, one frequency converter 3 is mounted on the wireless module board 2.

The amplifier phase shifter 4 is an IC chip that changes the phase and intensity of a wireless signal, and is mounted on the other surface 2b of the wireless module board 2. As a result, the amplifier phase shifter 4 is connected to the wiring pattern of the wireless module board 2. In this embodiment, eight amplifier phase shifters 4 are mounted on the wireless module board 2. Each amplifier phase shifter 4 mounted on the wireless module board 2 is connected to the frequency converter 3 via the wiring pattern of the wireless module board 2. In addition, each amplifier phase shifter 4 is connected to the antenna 21 via a wiring pattern of the wireless module board 2. That is, each amplifier phase shifter 4 is provided between the frequency converter 3 and the antenna 21.

The band-pass filter 5 is a chip component that passes a frequency band of a wireless signal and attenuates a signal (noise) in a band other than the frequency band. The band-pass filter 5 is mounted on the other surface 2b of the wireless module board 2 and is connected to the wiring pattern of the wireless module board 2. As a result, the band-pass filter 5 is connected to the frequency converter 3 via the wiring pattern. In addition, the band-pass filter 5 is connected to the amplifier phase shifter 4 via a wiring pattern. That is, the band-pass filter 5 is provided between the frequency converter 3 and the amplifier phase shifter 4.

In this embodiment, two band-pass filters 5 are mounted on the wireless module board 2. The same frequency converter 3 is connected to the two band-pass filters 5. In addition, four amplifier phase shifters 4 are connected to each of the two band-pass filters 5.

Figure 2:
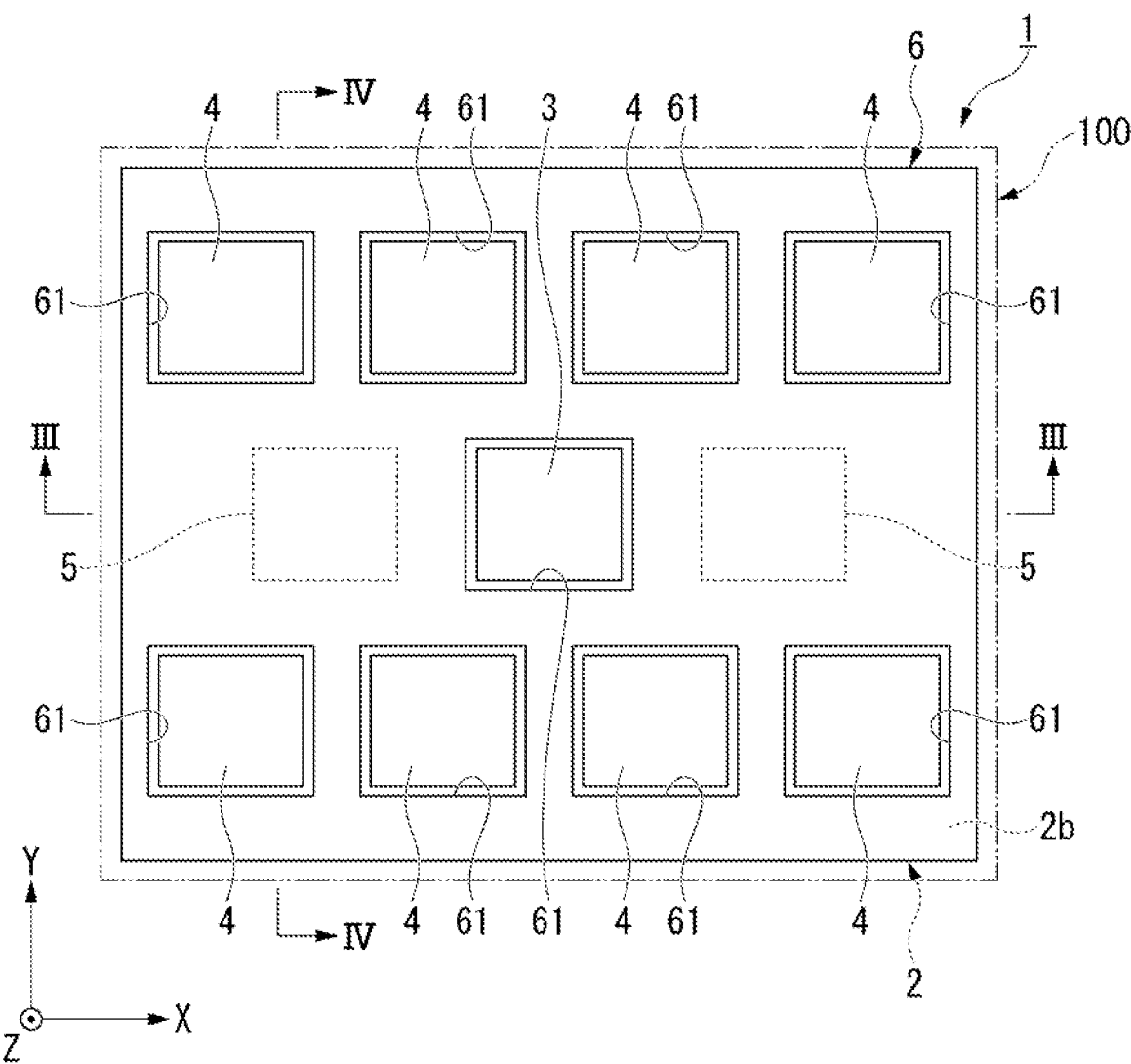
FIG. 2 is a plan view of a wireless communication module according to an embodiment of the present invention.

In the present embodiment, in the plan view shown in FIG. 2, one frequency converter 3 is arranged in the central region of the other surface 2b of the wireless module board 2. The two band-pass filters 5 are arranged on opposite sides of the frequency converter 3 in the lateral direction (X direction). The four amplifier phase shifters are arranged so as to be arranged in horizontal directions on both sides of the frequency converter 3 and the two band-pass filters 5 in the vertical direction (Y direction). As a result, the four amplifier phase shifters are arranged around each band-pass filter 5.

By arranging one frequency converter 3, two band-pass filters 5, and eight amplifier phase shifters 4 as described above, the length of the wiring pattern of the wireless module board 2 connecting the frequency converter 3 and the band-pass filter 5 and the length of the wiring pattern of the wireless module board 2 connecting the band-pass filter 5 and the amplifier phase shifter 4 can be shortened.

Figure 3:
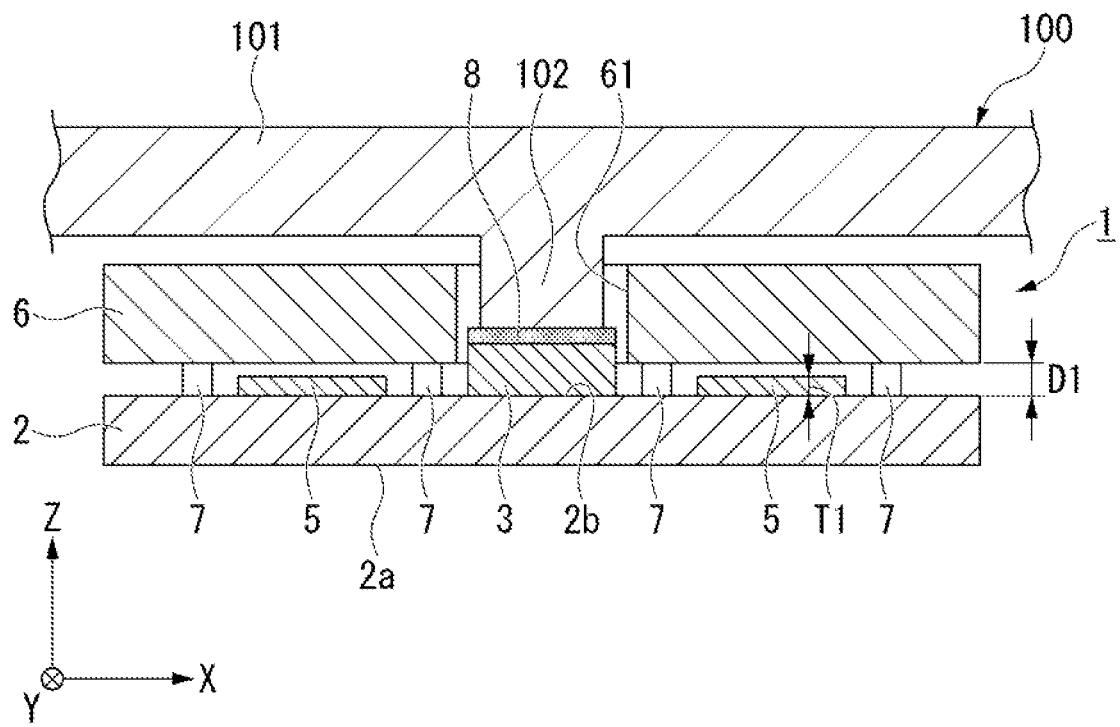
FIG. 3 is a cross-sectional view taken along the line III-III of FIG. 2.
Figure 4:
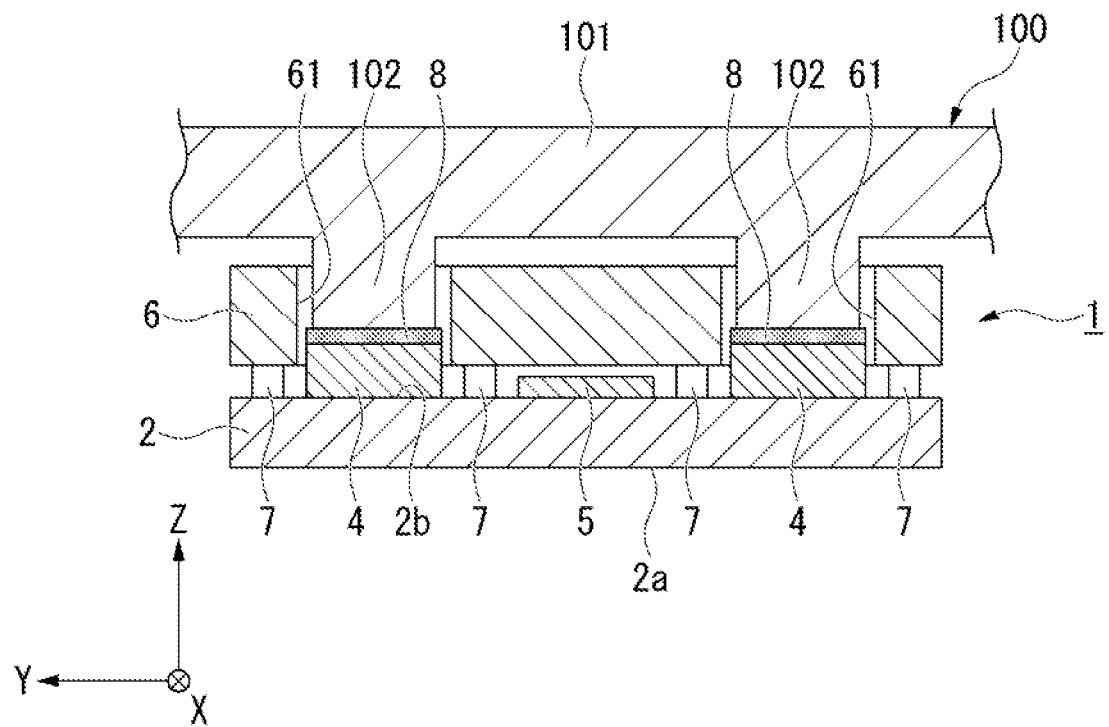
FIG. 4 is a cross-sectional view taken along the line IV-IV of FIG. 2.

Similar to the wireless module board 2, a wiring pattern (not shown) formed of conductors is formed on the communication board 6. As shown in FIGS. 3 and 4, the communication board 6 is provided on the other surface 2b of the wireless module board 2 at intervals via the connecting member 7. The wiring pattern of the communication board 6 is electrically connected to the wiring pattern of the wireless module board 2 by the connecting member 7. The connecting member 7 is a bump formed from, for example, solder or a conductor such as gold, silver, or copper. The wiring pattern of the communication board 6 constitutes the circuit of the wireless communication module 1 together with the wiring pattern of the wireless module board 2, the frequency converter 3, the amplifier phase shifter 4, and the band-pass filter 5.

As shown in FIGS. 2 to 4, a plurality of through-holes 61 are formed in the communication board 6. The through-hole 61 penetrates the communication board 6 in the thickness direction (direction in which the wireless module board 2 and the communication board 6 are arranged; Z direction). The through-hole 61 is formed in a portion of the communication board 6 where the frequency converter 3 and the amplifier phase shifter 4 face each other.

One through-hole 61 corresponds to one frequency convener 3 and eight amplifier phase shifters 4. That is, nine through-holes 61 are formed in the communication board 6 of the present embodiment. Each through-hole 61 is formed so that the frequency converter 3 and the amplifier phase shifter 4 fit inside each through-hole 61 in the plan view shown in FIG. 2. As a result, the frequency converter 3 and the amplifier phase shifter 4 are exposed to the outside of the wireless communication module 1 through the through-holes 61 of the communication board 6.

A through-hole 61 is not formed in the portion of the communication board 6 where the band-pass filter 5 faces. Therefore, the band-pass filter 5 is covered with the communication board 6. Here, the thickness T1 (see FIG. 3) of the band-pass filter 5 is smaller than the distance D1 (see FIG. 3) between the other surface 2b of the wireless module board 2 by the connecting member 7 and the communication board 6. Therefore, there is a gap between the communication board 6 and the upper surface of the band-pass filter 5 facing the communication board 6. That is, the band-pass filter 5 does not conic into contact with or press against the communication board 6.

When the wireless module board 2 and the communication board 6 are an Ball Grid Array (BGA) comprising connection members 7 as solder balls, according to the pitch of the connecting member (solder ball) 7 in the wireless module board 2 and the communication board 6, the diameter of the connecting member (solder ball) 7 related to the distance D1 between the other surface 2b of the wireless module board 2 and the communication board 6 also changes. Therefore, the thickness T1 of the band-pass filter 5 may be limited according to the pitch of the connecting member (solder ball) 7.

For example, when the pitch of the connecting member (solder ball) 7 is 1.27 mm, the diameter of the connecting member (solder ball) 7 is about 0.6 mm to 0.9 mm, so that the thickness T1 of the band-pass filter 5 may be 0.6 mm or less, in addition, for example, when the pitch of the connecting member (solder ball) 7 is 1 mm, the diameter of the connecting member (solder ball) 7 is about 0.55 mm to 0.65 mm, so that the thickness T1 of the band-pass filter 5 may be 0.5 mm or less.

As shown in FIGS. 3 and 4, the thickness of the frequency convener 3 and the amplifier phase shifter 4 may be arbitrary; however in the present embodiment, the thickness may be greater than the distance D1 between the other surface 2b of the wireless module board 2 and the communication board 6. Therefore, the upper portions of the frequency converter 3 and the amplifier phase shifter 4 enter the inside of the through-hole 61.

In the present embodiment, the heat dissipation sheet 8 is placed on the upper surface of the frequency converter 3 and the amplifier phase shifter 4 facing the through-hole 61 of the communication board 6. It is preferable that the heat dissipation sheet 8 have elasticity and adhesiveness so as to adhere tightly to the upper surfaces of the frequency converter 3 and the amplifier phase shifter 4. The thermal conductivity of the heat dissipation sheet 8 is higher than the thermal conductivity of the dielectric material (for example, the interlayer insulating film) of the communication board 6. Furthermore, in the present embodiment, the dielectric loss tangent of the heat dissipation sheet 8 at the wireless frequency (frequency of the wireless signal handled by the wireless communication module 1) is larger than the dielectric loss tangent of the dielectric material of the communication board 6.

In the wireless communication module 1 of the present embodiment configured as described above, as shown in FIGS. 3 and 4, the frequency converter 3 and the amplifier phase shifter 4 can be thermally connected to the heat radiating member 100. The heat radiating member 100 is formed of a material having high thermal conductivity such as aluminum, and has a main body 101 and a plurality of connecting protrusions 102 that integrally project from the main body 101.

The main body 101 is formed in a plate shape or a block shape. For example, heat radiation fins may be formed on the main body 101.

The plurality of connection protrusions 102 are each inserted into the through-holes 61 of the communication board 6. The tip of each connection protrusion 102 is connected to the upper surface of the frequency converter 3 and the amplifier phase shifter 4. The connection protrusion 102 may be directly connected to, for example, the upper surface of the frequency converter 3 and the amplifier phase shifter 4; however in the present embodiment, the connection protrusion 102 is connected to the upper surface of the frequency converter 3 and the amplifier phase shifter 4 via the heat dissipation sheet 8.

By interposing the heat dissipation sheet 8, the adhesion between the connecting protrusion 102 and the two components which are the frequency converter 3 and the amplifier phase shifter 4 is improved. As a result, the heat of the frequency converter 3 and the amplifier phase shifter 4 can be efficiently transferred to the heat radiating member 100.

The heat radiating member 100 described above may be, for example, a housing for accommodating the wireless communication module 1.

Next, an example of the operation of the wireless communication module 1 of the present embodiment will be described.

In the wireless communication module 1, first, the wireless signal is inputted to the frequency converter 3, so that the frequency converter 3 changes the frequency of the wireless signal. Next, the wireless signal outputted from the frequency converter 3 is distributed and inputted to the two band-pass filters 5. Each band-pass filter 5 attenuates or removes noise (a signal in a band other than the frequency band of the wireless signal) superimposed on the wireless signal. The noise superimposed on the wireless signal includes, for example, unnecessary radiation generated in the frequency converter 3 and the amplifier phase shifter 4.

The wireless signal outputted from each band-pass filter 5 is distributed and inputted to each of the four amplifier phase shifters 4. In each amplifier phase shifter 4, the phase and intensity of the wireless signal are changed. Finally, the wireless signals outputted from the eight amplifier phase shifters 4 are radiated from the antenna 21.

Here, since the antenna 21 is formed on one surface 2a of the wireless module board 2, the wireless signal outputted from the amplifier phase shifter 4 is radiated from one surface 2a of the wireless module board 2.

In the wireless communication module 1 of the present embodiment, since the phase and intensity of the wireless signal are changed in the plurality of amplifier phase shifters 4 as described above, high output and high gain can be obtained.

Furthermore, in the wireless communication module 1 of the present embodiment, the band-pass filter 5 is composed of chip components separate from the wireless module board 2 and the communication board 6. Therefore, the characteristics of the band-pass filter 5 can be sufficiently obtained as compared with the case where the band-pass filter 5 is formed by the wiring pattern of the wireless module board 2 and the communication board 6.

In the wireless communication module 1 of the present embodiment, a through-hole 61 is formed in a portion of the communication board 6 facing the frequency converter 3 and the amplifier phase shifter 4. Therefore, the heat generated in the frequency converter and the amplifier phase shifter can be released to the outside of the wireless communication module 1 through the through-hole 61 of the communication board 6 through the gap between the wireless module board 2 and the communication board 6. Furthermore, by connecting the heat dissipation member 100 to the frequency converter 3 and the amplifier phase shifter 4 facing the outside of the wireless module board 2 through the through-hole 61, the heat of the frequency converter 3 and the amplifier phase shifter 4 can be released to the outside of the wireless communication module 1 more efficiently.

Furthermore, since the formation of the through-holes 61 for heat dissipation is limited to the portion of the communication board 6 facing the frequency converter 3 and the amplifier phase shifter 4, the number and size of the through-holes 61 formed in the communication board 6 can be reduced. As a result, it is possible to prevent the wiring layout of the communication board 6 based on the formation of the through hole 61 from becoming complicated, and to prevent the wiring for the circuit on the communication board 6 from becoming long.

Therefore, in the wireless communication module 1 of the present embodiment, the wiring layout on the communication board 6 can be simplified while improving the heat dissipation of the frequency converter 3 and the amplifier phase shifter 4.

According to the wireless communication module 1 of the present embodiment, the thickness T1 of the band-pass filter 5 is smaller than the distance D1 between the wireless module board 2 and the communication board 6. As a result, the band-pass filter 5 can be arranged in the gap between the wireless module board 2 and the communication board 6 even if the other surface 2b of the wireless module board 2 is formed in a flat manner.

According to the wireless communication module 1 of the present embodiment, a heat dissipation sheet 8 having a higher thermal conductivity than that of the communication board 6 is placed on the upper surface of the frequency converter 3 and the amplifier phase shifter 4 facing the through-hole 61 of the communication board 6. As a result, the heat of the frequency converter 3 and the amplifier phase shifter 4 can be transferred to the heat dissipation sheet 8 more efficiently than the communication board 6. That is, it is possible to suppress the heat of the frequency converter 3 and the amplifier phase shifter 4 from being transferred to the communication board 6, and to prevent the temperature of the communication board 6 from rising.

According to the wireless communication module 1 of the present embodiment, the dielectric loss tangent of the heat dissipation sheet 8 at the wireless frequency is larger than that of the communication board 6. As a result, it is possible to suppress the generation of noise based on the heat dissipation sheet 8 mounted on the upper surface of the frequency converter 3 and the amplifier phase shifter 4.

Although the details of the present invention have been described above, the present invention is not limited to the above-described embodiment, and various modifications can be made without departing from the gist of the present invention.

In the wireless communication module 1 of the present invention, the through-hole 61 of the communication board 6 may be formed at a portion of the communication board 6 facing at least one IC chip of the frequency converter 3 and the amplifier phase shifter 4. The through-hole 61 may be formed only at the portion of the communication board 6 facing one of the plurality of amplifier phase shifters 4, for example. In addition, when the number of frequency converters 3 is plural, the through-holes 61 may be formed only in a portion of the communication board 6 facing one of the plurality of frequency converters 3, for example, or a portion of the communication board 6 facing all the plurality of frequency converters 3. Furthermore, the through-hole 61 may be formed only in the portion of the communication board 6 facing the IC chip that generates the most heat among the frequency converter 3 and the amplifier phase shifter 4, for example.

In the wireless communication module 1 of the present invention, the wireless module board 2 may have, for example, a recess formed from the other surface 2b, and a band-pass filter 5 may be mounted on the bottom surface of the recess. In such a case, even if the thickness T1 of the band-pass filter 5 is equal to or greater than the distance D1 between the other surface 2b of the wireless module board 2 and the communication board 6, the band-pass filter 5 can be arranged in the gap between the wireless module board 2 and the board 6.

In the wireless communication module 1 of the present invention, the number of the frequency converters 3, the amplifier phase shifters 4, or the band-pass filters 5 is not limited to the number shown in the above embodiment and may be arbitrary. For example, the number of the frequency converters 3, the band-pass filters 5, or the amplifier phase shifters 4 may be one each. In addition, for example, the number of the frequency converters 3 and the number of the band-pass filters 5 may be one, and the number of the amplifier phase shifters 4 may be a plurality. In such a case, the wireless signal outputted from the band-pass filter 5 through the frequency converter 3 can be distributed to the plurality of amplifier phase shifters 4 and then outputted to the antenna 21.

DESCRIPTION OF THE REFERENCE SYMBOLS

1: Wireless communication module
2: Wireless module board
2a: One surface
2b: Another surface
3: Frequency converter (IC chip)
4: Amplifier phase shifter (IC chip)
5: Band-pass filter
6: Communication board
7: Connection member
8: Heat dissipation sheet
21: Antenna
61: Through-hole

The invention claimed is:

1. A wireless communication module comprising:
a wireless module board in which an antenna is formed on a first surface or an inner layer;
a frequency converter mounted on a second surface of the wireless module board and changing a frequency of a wireless signal;
an amplifier phase shifter mounted on the second surface of the wireless module board and changing a phase and an intensity of the wireless signal;
a band-pass filter connected to the frequency converter and the amplifier phase shifter, and mounted on the second surface of the wireless module board so as to be provided between the frequency converter and the amplifier phase shifter; and
a communication board provided at intervals on the second surface via a connecting member and electrically connected to the wireless module board by the connecting member,
wherein a through-hole, which penetrates in a direction in which the wireless module board and the communication board are aligned, is formed at a portion of the communication board to which at least one of IC chips of the frequency converter and the amplifier phase shifter faces, and
wherein the band-pass filter is covered by the communication board.

2. The wireless communication module according to claim 1, wherein a thickness of the band-pass filter is smaller than a distance between the wireless module board and the communication board.

3. The wireless communication module according to claim 1, wherein a heat dissipation sheet having a higher thermal conductivity than a dielectric material of the communication board is placed on an upper surface of the IC chip facing the through-hole.

4. The wireless communication module according to claim 2, wherein a heat dissipation sheet having a higher thermal conductivity than a dielectric material of the communication board is placed on an upper surface of the IC chip facing the through-hole.

5. The wireless communication module according to claim 3, wherein a dielectric loss tangent of the heat dissipation sheet at a wireless frequency is greater than that of the communication board.

6. The wireless communication module according to claim 4, wherein a dielectric loss tangent of the heat dissipation sheet at a wireless frequency is greater than that of the communication board.

\* \* \* \* \*